Aug. 4, 1942. R. V. GRAYSON 2,292,068
APPARATUS FOR SIZE GRADING SHRIMP
Filed Dec. 22, 1939 3 Sheets-Sheet 3
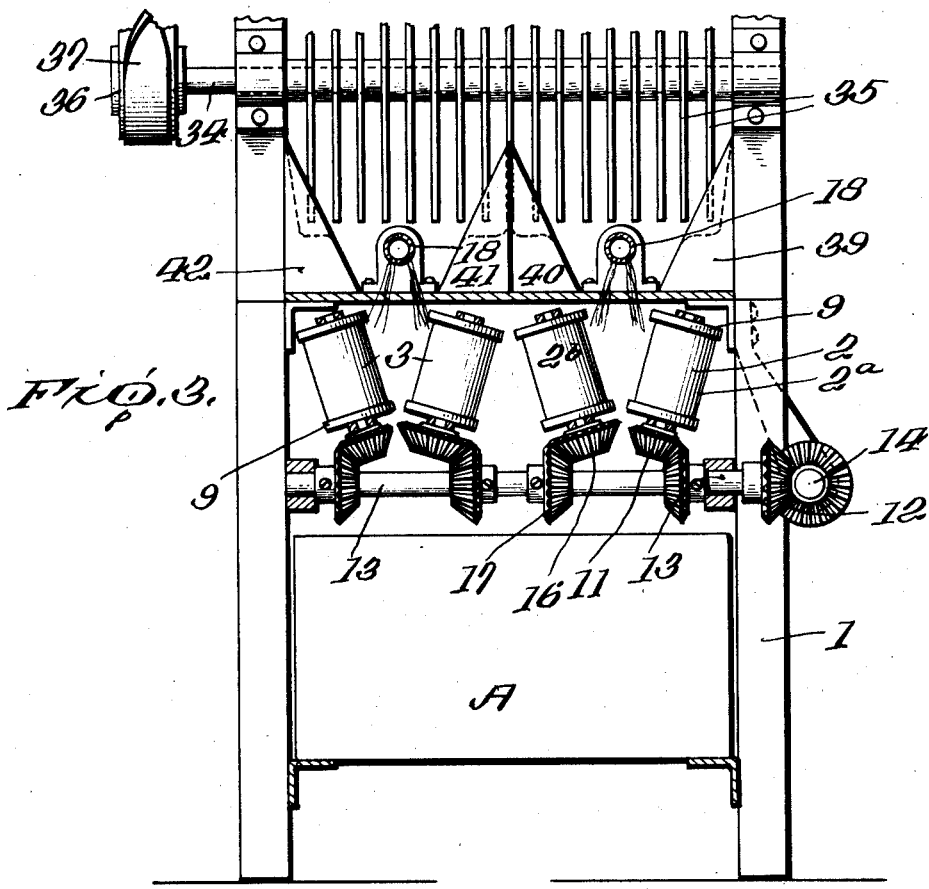
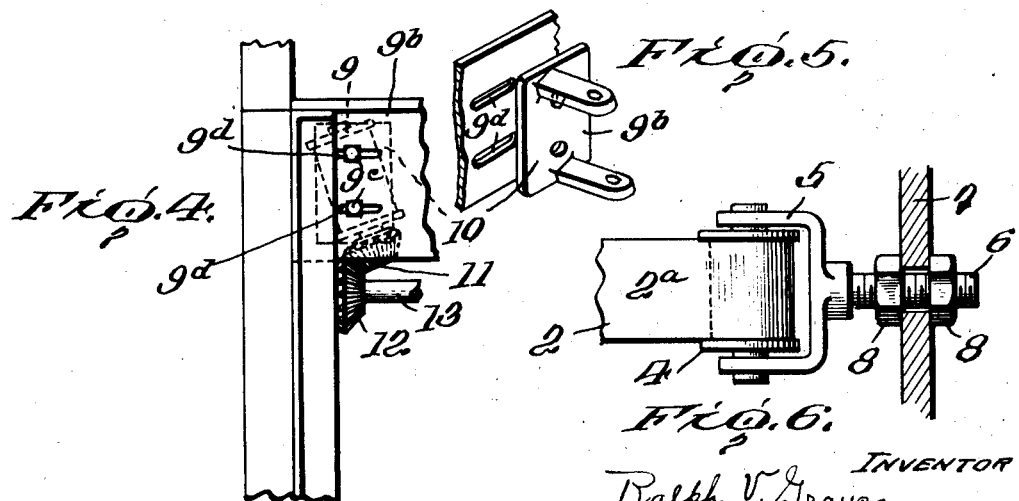
INVENTOR
Ralph V. Grayson
By Mason & Porter
ATTORNEYS Patented Aug. 4, 1942

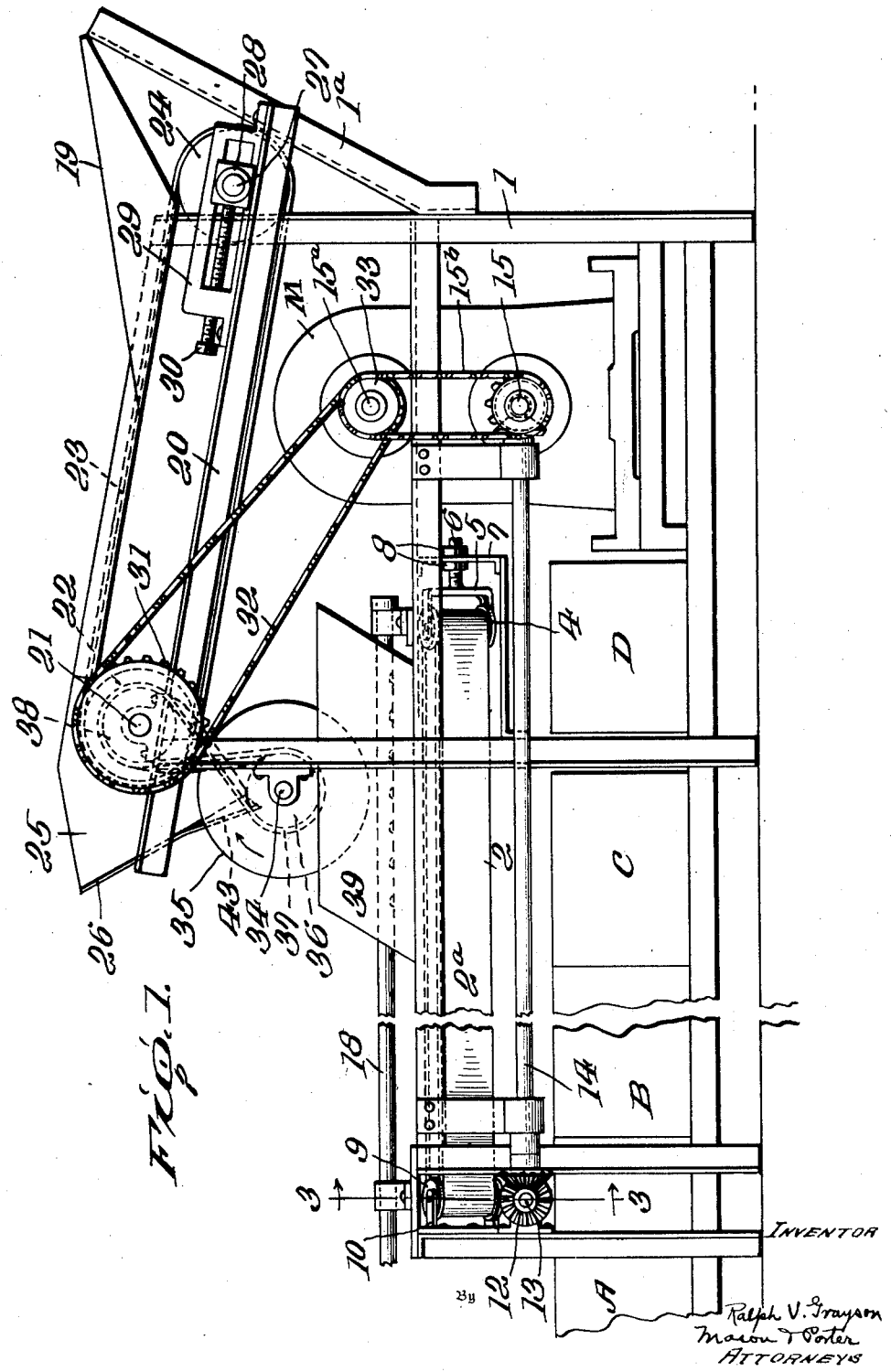

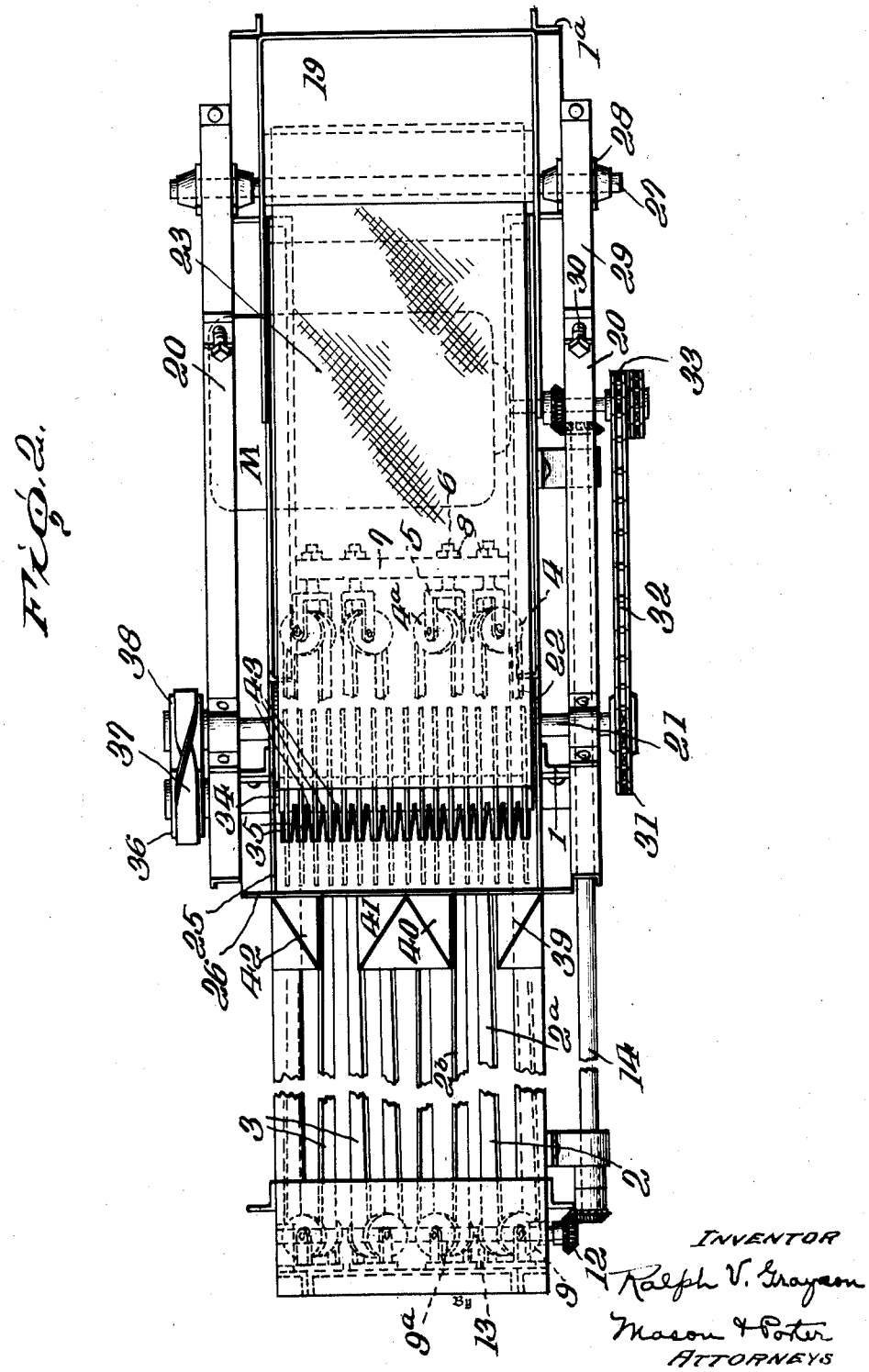

2,292,068

UNITED STATES PATENT OFFICE 2,292,068

APPARATUS FOR SIZE GRADING SHRIMP

Ralph V. Grayson, Houston, Tex., assignor to Kroger Grocery & Baking Company, Cincinnati, Ohio, a corporation of Ohio Application December 22, 1939, Serial No. 310,619

3 Claims. (Cl. 209—73)

It is well known that the price paid fishermen for their shrimp is determined by the size of the shrimp. It is customary for the fishermen to approximate the average size of the shrimp brought in from a catch, or a portion thereof, and if agreement cannot be reached, then a fixed quantity by weight is taken from the batch and the shrimp counted.

An object of the present invention is to provide a machine into which the shrimp brought in from the catch may be fed, and which machine will automatically grade the shrimp as to size and discharge the same into separate receptacles. Another object of the invention is to provide a means for driving the grading belts at a differential speed to facilitate the release of the shrimp therefrom.

A still further object of the invention is to provide a machine of the above type wherein the grading devices may be adjusted so that the size of the shrimp discharged into the collecting receptacles may be varied.

A still further object of the invention is to provide a machine of the above type with means for discharging jets of water on to the shrimp during the grading thereof.

These and other objects will in part be obvious and will in part be hereinafter more fully disclosed.

In the drawings—

Figure 1 is a front view of a machine embodying the improvements;

Fig. 2 is a plan view of the same;

Fig. 3 is an end view of the machine as viewed from the discharge end of the grading belts;

Fig. 4 is a detail showing the manner of mounting one of the pulleys at the delivery end of the grading belts so that it can be adjusted horizontally to different set positions to vary the angle of divergence between the grading belts;

Fig. 5 is a detail showing in perspective one of the supporting brackets for the pulley over which the grading belt runs at the discharge end thereof, and Fig. 6 is a detail, partly in section, showing the mounting for the pulley over which the grading belt runs at the inner end thereof, which supporting means enables the tension on the belt to be adjusted.

The grading machine embodying my improvements includes grading belts which are operated continuously. The grading belts are preferably arranged in pairs with the opposed faces thereof inclined upwardly and away from each other. The adjacent lowermost edge portions of the belts are disposed so that they diverge away from each other in the direction of their movement. The shrimp is fed on to these grading belts so that it moves with the belts in an endwise direction, and will be discharged through the space betweeen the belts when they reach a point where the distance between the belts is less than the thickest portion of the shrimp. Means is provided for receiving the shrimp in bulk and promiscuously as to size. This receiving means is in the form of a hopper which discharges the shrimp on to a wire mesh belt, and the wire mesh belt in turn discharges the shrimp on to positioning devices which operate to turn the shrimp so that when it is fed on to the grading belts it will move in an endwise direction and be graded according to thickness as distinguished from length. The positioning means includes a series of spaced disks which are a sufficient distance apart to permit the largest size shrimp to pass between the disks when turned so that the body portion of the shrimp is parallel with the plane of the positioning disks. These disks are rotated and will thus cause sufficient agitation of the shrimp being discharged on to the same, so that the large size shrimp will pass through between the disks in the manner described and will drop on to the grading belts beneath the disks. The shrimp of average size will also be positioned so that when it contacts with the grading belts, it will be moved in an endwise direction. The smaller shrimp may pass between the disks without being properly positioned for discharge on to the grading belts, and in order to take care of these smaller shrimp, I have provided plates which extend between the disks on to which the small shrimp fall and along which they slide and discharge off from the lower ends thereof. These plates lie between the disks, and each plate is given a twist of approximately 45° so that the shrimp striking flat against the plate will be turned so as to be discharged on to the grading belts in proper posiion for endwise movement with the belts.

Referring more in detail to the drawings, my improved shrimp grading machine includes a supporting framework which is indicated as a whole by the numeral 1. Extending lengthwise of this framework is a pair of grading belts 2, 2. As illustrated, there is also a second pair of grading and sizing belts 3, 3. These grading belts are similar in construction and a detail description of one pair of the belts will answer for both. These belts are endless. A belt 2a runs over a pulley 4 at the right-hand end thereof as viewed in Figure 1. This pulley 4 is mounted in a bracket 5 carried by a stud 6 which passes through a cross bar 7 formed as a part of the main frame 1. Nuts 8, 8 serve as a means for adjusting the position of the pulley 4. The belt 2a runs over a similar pulley 9 at the left-hand end of the machine. This pulley 9 is mounted on a suitable bracket 10. The pulley 9 carries a bevel gear 11 at the lower end thereof which meshes with a bevel gear 12 on the counter-shaft 13. The counter-shaft 13 is geared to a driving shaft 14 which in turn is geared to a motor driven shaft 15. The motor for driving the shaft is indicated at M.

The grading belt 2b which is associated with the grading belt 2a runs over a pulley 4a mounted in the same manner as the pulley 4. It also runs over a pulley 9a at its other end, which pulley carries a gear 16 meshing with a bevel gear 17 on the counter-shaft 13. The bracket supporting the pulley 9 is secured to the frame so that it may be shifted in a horizontal direction. The bracket carrying the pulley 9a may be likewise shifted in a horizontal direction. The adjustable mounting for one of the pulleys is shown in Figures 4 and 5. The bracket 9b for supporting the pulley 9 is provided with bolt holes for clamping bolts 9c which extend through slots 9d in the cross member of the frame upon which the bracket is supported. This makes a very simple means whereby the pulley can be bodily shifted in a horizontal direction, and thus the angle of divergence between the belts altered. Of course, when the bracket is shifted, the bevel gear 12 which drives the same will be likewise shifted on the shaft 13.

The grading belts 3, 3 run over similar pulleys at opposite ends thereof and are driven and shiftable in the same manner as the grading belts 2. It is noted that the axes of the pulleys 9 and 16 are inclined outwardly away from each other in an upward direction. The pulleys 4 and 4a are similarly inclined, and therefore, the opposed faces of the grading belts will be inclined outwardly away from each other in an upward direction. This, in a measure, forms a trough in which the shrimp to be graded and sized are discharged one after another, and the shrimp is so discharged on to the grading and sizing belts that they will be moved in an endwise direction by the belts.

It is noted from Figure 2 that the pulleys 9 and 9a are spaced a greater distance than the pulleys 4 and 4a, and therefore, the lowermost adjacent edge portions of the belts diverge in the direction in which they are moving. This will gradually increase the distance between the lower edges of the belts toward the left-hand end of the machine as viewed in Figure 1. As the shrimp is carried along by the belts, the small shrimp will drop from between the belts first, and just as soon as the distance between the belts is less than the thickness of the shrimp, the shrimp of average size will next drop through between the belts. The shrimp of large size, commonly referred to as "big shrimp" will next be dropped by the belts, and last, the shrimp of jumbo size will drop from the belts or it will be discharged off from the ends of the conveyor belts. As shown in Figure 1, there are four receptacles A, B, C and D. The belts may be adjusted so that the smaller shrimp will be discharged into the receptacle D, the average size shrimp will be discharged into the receptacle C, the big shrimp will be discharged into the receptacle B and the jumbo shrimp will be discharged into the receptacle A.

It will be noted from Figure 3 that the gear 11 is slightly smaller in diameter than the gear 12. As a result, the belt 2a will be driven at a slightly greater speed than the belt 2b. This differential speed of the two belts greatly aids in preventing the shrimp from sticking to the belts and in the discharge of the shrimp from between the belts. It is noted that over the grading belts 2a and 2b is a perforated water pipe 18. This perforated water pipe discharges sprays of water on to the shrimp and the grading belts, and this will wash the shrimp off from the belts, preventing the slime from hardening thereon. It will also wash the shrimp and aid in the discharging of the shrimp from the belts. There is a similar water pipe used in conjunction with the grading belts 3, 3.

The shrimp to be graded and sized may have the heads removed before they are graded, or if desired, the shrimp may be graded and sized without removing the heads. The shrimp as it is received by the fishermen from the catch is placed promiscuously as to size in the hopper 19. This hopper is mounted on the frame structure 1, and is supported at its outer end by suitable braces indicated at 1a.

The frame structure is extended upwardly and carries angle bars or beams 20, 20. Mounted on these angle bars is a shaft 21 carrying a cylindrical pulley 22 over which a wire mesh belt runs. There is a similar cylindrical pulley 24 adjacent the hopper which is likewise mounted on a shaft 27 carried by the angle bars 20, and the wire mesh belt 23 runs over this pulley 24, and thus beneath the hopper 19. The shrimp placed in the hopper will be gradually removed therefrom on to the wire mesh belt. There are side plates 25 at each side of the wire mesh belt, and these side plates are connected by a cross plate 26 at the left-hand end thereof as viewed in Figure 1, the purpose of which will be hereinafter more fully disclosed. The shaft 27 supporting the cylindrical pulley 24 is journaled in bearings, one of which is indicated at 28 (Figure 2). These journal bearings are shiftable in supporting brackets 29, and the brackets 29 are shifted by means of threaded bolts 30 so that the wire mesh belt may be put under proper tension for supporting the weight of the shrimp. The belt is driven by a sprocket wheel 31 mounted on the end of the shaft 21. A sprocket chain 32 runs over this sprocket wheel 31 and also over a sprocket wheel 33 on the shaft 15a which in turn is driven by a sprocket belt 15b from the shaft 15 of the motor M. The shrimp is discharged by the wire mesh belt on to a series of spaced disks 35 carried by a shaft 34 mounted in extensions of the main frame structure. These disks are rotated in a clockwise direction. The shaft 34 carries a belt wheel 36 and a belt 37 running over the belt wheel 36 also runs over a belt wheel 38 on the opposite end of the shaft 21 from the sprocket wheel 31 (see Figure 2). This belt is crossed so that the disks are moved in a clockwise direction, while the cylindrical pulley over which the wire mesh belt runs turns in a counter-clockwise direction.

As the shrimp is discharged from the upper end of the wire mesh belt it drops on to these disks. The disks are so spaced that the distance between the adjacent disks is slightly greater than the thickness of a jumbo shrimp. The result is that if the shrimp strikes the disk crosswise, it will be carried along and turned, owing to the fact that the shrimp is large at one end and small at the other, so that it will pass down between the disks. Directly beneath these disks are guiding plates 39 and 40 which are associated with the belts 2, 2, and there are similar guiding plates 41 and 42 associated with the grading belts 3, 3. The shrimp which is discharged by the disks will contact with these plates and be delivered thereby on to the grading and sizing belts so that the shrimp lies lengthwise of the direction of travel of the belts and will be moved in an endwise direction by the belts.

The big shrimp and the medium grade shrimp will also contact with these positioning disks and be turned so as to fall between the same and will thus be discharged on to the grading and sizing belts in a similar manner so that the shrimp will be moved in an endwise direction by the grading belts, and the point of discharge from the grading and sizing belts will be determined by the thickness of the shrimp.

The small shrimp, however, may fall between the disks without being properly positioned to fall on to the grading and sizing belts so as to lie lengthwise thereof. The plate 26 is provided with a series of slots in which the disks move and the portions 43 of these plates between the disks and near the bottom ends thereof are given a 90° turn. The small shrimp will strike on these plates as it falls between the disks, and as this small shrimp passes down the plates on to these quarter-turned portions, this will give sufficient swing to the shrimp so as to discharge them on to the grading and sizing belts in a lengthwise direction, that is, so that they will be moved by the grading belts in an endwise direction.

When the grading apparatus is to be used on shrimp before the heads are removed therefrom, it is preferable to provide the positioning disks with sharp edges which will cut the feelers from the head of the shrimp and thus greatly facilitate the grading of the shrimp.

The operation of the grading apparatus may be briefly summarized as follows: The shrimp is placed in the hopper as it is received from the catch without removing the heads, or if desired, the heads may be removed and then the shrimp, regardless of size, placed in the hopper. The shrimp will gradually move on to the traveling wire belt and be carried to the upper end thereof and discharged on to the positioning disks. As the shrimp falls on to the positioning disks, the larger grade and the intermediate grade, and sometimes the smaller grade of shrimp, will be directed by these positioning disks so that the shrimp will fall on to the grading belts and lie thereon so that they are moved endwise by the belts to the final discharge position. The smaller shrimp which is not positioned by the disks will contact with these positioning plates and be turned so that it will likewise fall on to the grading belts so that they lie lengthwise of the travel of the belts. The shrimp will be released by the grading belts at different points, depending upon the thickness of the shrimp. The smaller shrimp will be first released, then the shrimp of intermediate grade, then the big shrimp, and finally the jumbo shrimp; thus it is that the four receptacles will receive shrimp according to their size. By adjusting the grading belts so as to either close up or broaden the angle of divergence of the traveling belts, the grading of the shrimp can be varied. If the shrimp is running unusually small and it is still desired to make two or three different grades as to sizes, this can readily be done by bringing the delivery ends of the belts a little closer together. On the other hand, if the shrimp is running unusually large, then the grading as to size may be varied by moving the discharge ends of the grading belts a slight distance away from each other. This is accomplished by loosening the nuts holding the brackets that carry the rollers over which the discharge ends of the grading belts run and the shifting of the same on the frame.

It is obvious that many changes in the details of construction may be made without departing from the spirit of the invention as set forth in the appended claims.

Having thus described the invention, what I claim as new and desire to secure by Letters Patent is:

1. An apparatus for grading shrimp comprising grading members having their longitudinal axes extending in the same general direction and diverging away from each other from the receiving end thereof, means disposed above the grading members for feeding the shrimp promiscuously as to arrangement thereto, a plurality of shrimp positioning disks disposed between the feeding means and the grading members, means for mounting said disks for rotation about an axis extending transversely of the grading members, said disks being spaced a distance slightly greater than the thickness from side to side thereof of the largest shrimp to be graded, shrimp positioning plates extending between the disks, said plates having the ends thereof between the plates substantially parallel with the disks, whereby shrimp contacting with the disks and the disks will be turned and directed on to the grading members so that the shrimp will be supported by engagement of the sides of the shrimp with the grading members.

2. An apparatus for grading shrimp comprising pairs of grading belts disposed with opposed faces adjacent each other and inclining upwardly away from each other, the lower edge portions of the belts diverging away from each other in their direction of movement, means for moving the belts, means for adjusting the belts for varying the angle of divergence, means disposed above the belts for feeding the shrimp promiscuously as to arrangement thereto, a plurality of shrimp positioning disks disposed between the feeding means and the grading members, means for mounting said disks for rotation about an axis transversely of the belts, said disks being spaced from each other a distance slightly greater than the thickness from side to side thereof of the largest shrimp to be graded, and shrimp positioning plates extending between said disks, said plates being shaped so that the portions thereof between the disks are substantially parallel with said disks whereby the shrimp contacting with said disks and plates will be turned and directed on to the belts so that the shrimp will be supported by engagement of the sides of the shrimp with the grading belts.

3. An apparatus for grading shrimp comprising movable grading members having the surfaces thereof contacting with the shrimp during grading, extending in the same general direction and diverging away from each other from the receiving end thereof, feeding means disposed above the grading members for discharging shrimp by gravity onto the grading members, a plurality of shrimp positioning disks mounted for rotation about an axis extending transversely of the grading members, said disks being parallel to each other and spaced a distance slightly greater than the thickness from side to side of the largest shrimp to be graded, stationary shrimp positioning plates extending between the disks, said disks and plates being disposed at a distance below said shrimp delivering means whereby shrimp falling by gravity contact with the disks and plates and will be turned and delivered onto the grading members so that the shrimp will be supported by engagement of the sides of the shrimp with the grading members.

RALPH V. GRAYSON.